UNIVERSAL LONG LOOP ANTI-SIDE-TONE TELEPHONE CIRCUIT
Filed Sept. 25, 1967
FIG. 1
PRIOR ART
Anti-Side-Tone Telephone Circuit
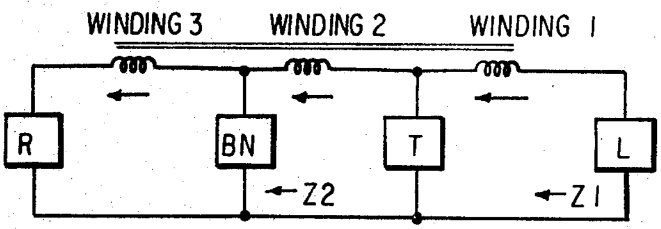
PRIOR ART FIG. 3
Two Transformer Bridge Type Anti-Side-Tone Telephone Circuit
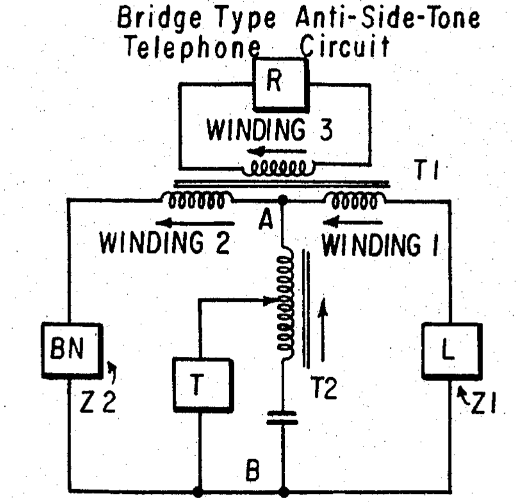
FIG. 2
PRIOR ART
Bridge Type Anti-Side-Tone Telephone Circuit
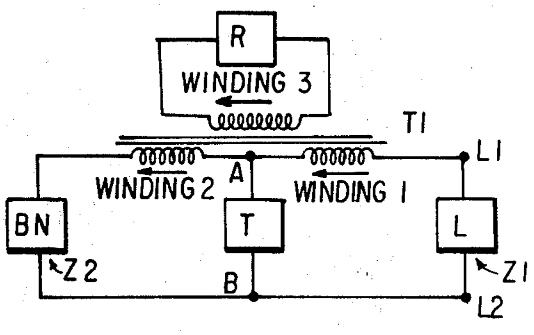
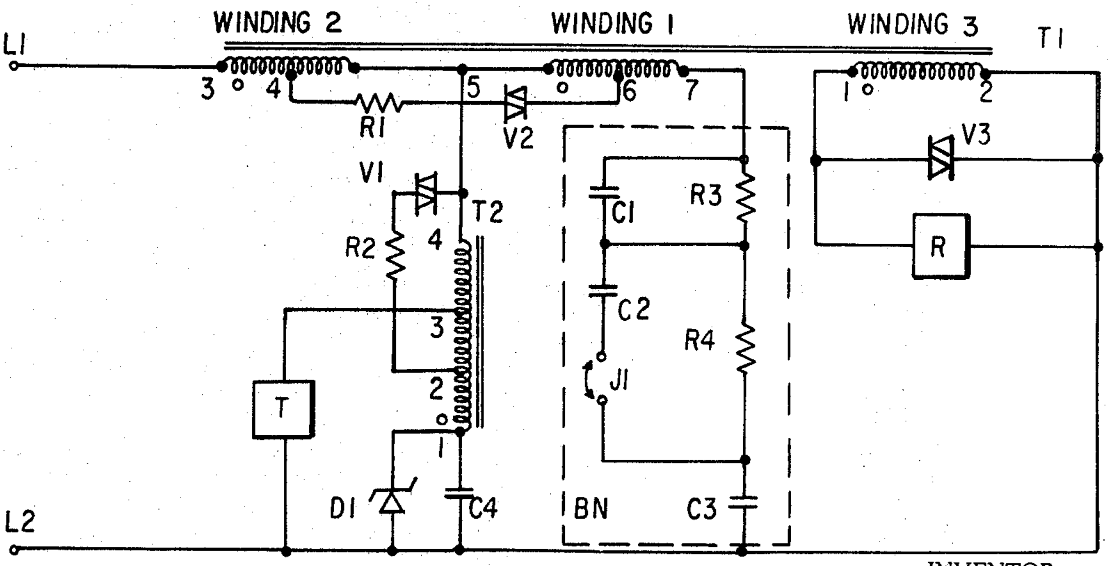
FIG. 4
Long Loop Anti-Side-Tone Telephone Circuit
INVENTOR.
VICTOR G. BURGER
BY Bernard E. Franz
ATTY.

United States Patent Office 3,517,138
Patented June 23, 1970

3,517,138

LONG LOOP ANTI-SIDE-TONE TELEPHONE CIRCUIT

Victor G. Burger, Elmhurst, Ill., assignor to Automatic Electric Laboratories, Inc., Northlake, Ill., a corporation of Delaware Filed Sept. 25, 1967, Ser. No. 670,116
Int. Cl. H04m *1/58*
U.S. Cl. 179—81 7 Claims

ABSTRACT OF THE DISCLOSURE

A subscriber station telephone circuit having a bridge transformer to couple the transmitter to the line and the balancing impedance in opposite phase. The receiver is magnetically coupled so as to receive practically no side-tone during transmission. An autotransformer is used to couple the transmitter to the bridge transformer. Separate transmission and receiving regulators are used to provide independent regulation for each function.

FIELD OF THE INVENTION

This invention relates to hybrid arrangements, and more particularly to transducer coupling, transmission level equalizing and to side-tone balancing circuits of the type useful in subscriber telephone sets.

DESCRIPTION OF THE PRIOR ART

Present day two-wire subscriber telephone circuits are almost universally arranged in a hybrid configuration and are of the anti-side-tone type. The basic anti-side-tone telephone circuit is shown in FIG. 1.

Maximum transfers of power occur only when the transmitter T, receiver R, line L and an additional power consuming impedance BN of a telephone circuit are so connected as to each be matched in impedance to the remainder of the circuits. This conjugacy is obtained by a proper poling, and turns ratios of the three windings. When so connected, then:

(a) the transmitter output is divided between the line impedance and the balance impedance, with no input to the receiver, the desired no-side-tone condition, and;
(b) the input from the line to the telephone is divided between the transmitter and the receiver with no input to the balance impedance.

Lack of output from the receiver to the transmitter, and from the balance impedance to the line, which also follow, are unimportant to the working of the circuit as these impedances do not normally have outputs.

Present day designs utilizing higher sensitivity transmitters and greater efficiency receivers for use with longer length lines as well as lines of shorter length require some form of automatic control of the transmit and receive levels on a graduated basis as the loop length increases. This is generally accomplished through the use of a current-sensitive resistance element connected across the line terminals of the transmission circuit. The added line impedance imposed by this element is compensated for by a similar device connected across the balance impedance, thus sacrificing overall set efficiency for the regulation required.

The transmitter of the set usually is made low in resistance because it is in series with the loop and influences the permissible loop range of the set from the standpoint of supervision. The impedance Z1, FIG. 1, as seen when looking toward the line is relatively high. If acceptable transmitting levels are to be obtained, the low impedance of the transmitter must be matched to the high impedance of the line by a proper turns ratio between windings 1 and 2. Therefore the impedance Z2 when looking toward the balance impedance BN must be made low, and since the current-sensitive element is part of this network, its resistance value is quite low, again imposing a hardship upon the design of the circuit because of the relatively fragile construction of such a device.

The "booster" type circuit of FIG. 1 is by far the most popular type used in common battery anti-side-tone telephone sets, though other circuit arrangement, such as those of FIGS. 2 and 3, are possible. Both of these latter circuits are of the "bridge" type.

The circuit of FIG. 2 basically consists of a transformer T1 with the line connected to terminals L1 and L2 at one side of the transformer, and a network balancing impedance BN at the other side of the transformer. The receiver R is magnetically coupled through a third winding on the transformer while the transmitter or driving source T is connected to the center of the primary winding and a common point between the line and balancing impedance.

In this configuration, in the transmitting mode, the undulating current flow through the transmitter is divided between the line and balancing impedance if they have equal characteristics. The receiver will receive practically no energy since the current in the two branch windings will be equal in magnitude and of opposite phase, thus cancelling out any magnetic coupling to the receiver winding.

The transmitter T is of the carbon granule type. A transmitter of this type is normally designed to have an A.C. resistance of 500 to 600 ohms. This resistance value is necessary to match the impedance at the place of insertion. The terminating impedance for transmitter T is that of Z1 in parallel with Z2 which is about 500 ohms. This resistance value however is not the resistance value that would enable the manufacture of a transmitter of optimum performance within the physical limitations of a present day subset. A carbon granule transmitter with that high an impedance, which is almost purely resistive, would place a tremendous restriction on the present day loop range from a supervisory standpoint. Where the maximum permissible D.C. resistance of the transmitter is limited to 250 ohms—almost the entire subset resistance—while its A.C. impedance centers around 200 ohms.

Adapting the circuit of FIG. 2 to that of FIG. 3 by the use of an autotransformer T2 now makes it possible to step-up the lower impedance transmitter to match the higher impedance between points A and B. This expedient permits the use of a more efficient transmitter design with the bridge circuit configuration.

SUMMARY OF THE INVENTION

Briefly, according to the present invention, the telephone substation utilizes a two-transformer type of circuit with a high efficiency and high output transmitter and a sensitive receiver. Thus, it is necessary to have good side-tone reduction to prevent this combination from causing the user to lower his speaking voice because of the side-tone in his receiver. The use of a high output transmitter also necessitates some means to regulate the output from the telephone when working into a short line. When the telephone is connected to a short line the received signal may be excessive too, and therefore a regulator is required for this function of the telephone. However, the two conditions of excessive output and an excessive input do not always go together, that is, the current to the trasmitter may be too great while the received signal may be low, therefore ideally the regulation for each of these functions should be independent of the other and not, as done in some presently designed sets, where the regulation of both functions is based upon the current flowing to the transmitter.

This independent regulation of the current to the transmitter and of the transmitted signal level as well as the received signal level without affecting the sidetone balance is accomplished by the multiple use of the two transformers. That is the autotransformer is used to match the impedance of the regulating element as well as the impedance of the transmitter to the circuit. The bridge transformer in addition to providing the "bridge" arms for balancing the line and balancing impedance is also used to match the impedance of the receiving level regulating element. These additional uses of the transformers result in a novel combination that provides an improved overall operation, and has the additional advantages of permitting the use of regulating elements that are economical and rugged.

BRIEF DESCRIPTION OF THE DRAWINGS

The foregoing and numerous other advantages of the invention will be more apparent by reference to the following detailed description of an illustrative embodiment of the invention, when read in conjunction with the drawing, in which:

FIG. 1 is a simplified schematic of a prior art anti-sidetone telephone station circuit;

FIG. 2 is a simplified schematic of a prior art bridge-type anti-side-tone telephone station circuit;

FIG. 3 is a simplified schematic of a prior art two transformer bridge type anti-side-tone telephone station circuit; and FIG. 4 is a schematic of the circuit embodying the principles of this invention.

DESCRIPTION OF THE PREFERRED EMBODIMENT

The circuit of FIG. 4 discloses a configuration wherein the transmitter current is regulated to a value of approximately 30 ma. for all loops with conductor loop resistances of 1,000 ohms or less. To thus limit the maximum D.C. power dissipated within the transmitter to less than 300 milliwatts, insures a longer life and less aging with a considerable decrease in the self-generated noise within the transmitter.

This regulation of the transmitter current is provided by D1, a single anode silicon Zener diode, in parallel with the transmitter and in series with part of the winding of T2, to provide a D.C. shunt across the transmitter T at high loop current conditions. The inductance between terminals 1 and 3 provides a D.C. current shunt path of about 10 ohms, but has an A.C. signal impedance of at least 3,000 ohms. This very effectively isolates the extremely low dynamic impedance of D1 from the A.C. signals while permitting it to regulate the D.C. current through the transmitter T. Additional A.C. signal regulation is brought about by V1—a silicon diode type varistor, (two diode junctions oppositely poled and in parallel) as a function of increased current through D1 and the voltage drop across the portion of the winding between terminals 2 and 4 of T2. Resistor R5 in series with V1 modifies the lower shunt value and also limits the minimum impedance that the shunt can present to the coil.

Autotransformer T2 has a capacitor C4—a tantalum electrolytic type—shunting diode D1. This is important on long loops, when diode D1 is not conducting, to provide a low impedance A.C. signal path; and has a capacitance value such that the series resonance with the portion of the winding between terminals 1 and 3 of T2 is below the useable audio range. As can be seen, the utilization of transformer T2 for a multiplicity of functions, greatly increases the usefulness, efficiency and ruggedness of the transmitter portion of the circuitry.

The anti-side-tone balancing network BN consists of resistors R3 and R4 and capacitors C1, C2 and C3, capacitor C3 serves mainly as a D.C. blocking capacitor for the network. Upon connection to a longer non-loaded cable; or, a loaded cable with long end sections and/or high capacitance bridge-taps, C2 is normally in the circuit. However, for connections on longer loaded cables but with very short end sections, C2 may optionally be disconnected by the removal of shunt J1 for improvement of the side tone balance.

In the receiving mode the windings between terminals 3–5 and 5–7 of transformer T1, are poled to magnetically aid each other, to thus magnetically induce a signal in receiver R. Regulation of the received A.C. signal levels is effected by V2 (an identical type varistor to V1) as a function of the increased current through and the voltage drop across that portion of the windings between terminals 4 and 6 of T1. Resistor R1 in series with V2 modifies its lower shunt value and also limits the minimum impedance that the shunt can present to the coil. When so positioned within the circuit, there is no effect upon the side tone or circuit balance. V3 is a varistor, (click reducer) placed across the receiver solely for the purpose of suppressing high voltage transients to prevent annoying clicks in the ear of the user.

It will be apparent that applicant has provided an improved telephone circuit with a better and more flexible means of operation. The current to the transmitter is regulated to the optimum value so that the power dissipated within the transmitter is held within safe bounds thus providing for a longer life and less self-generated noise, and the received signal level as well as the transmitted signal level are each independently controlled without affecting the side-tone balance. Further the multiple use of the transformers for matching the impedance of the regulating elements permits the use of a more reliable unit in each application, thus further contributing to the overall durability of the telephone.

Various changes and alternative implementations will now occur to those skilled in the art without departing from the true spirit and scope of the invention. Accordingly, it is not intended that the invention be limited to that which has been particularly shown and described, except as such limitations appear in the appended claims.

What is claimed is:

1. A telephone substation circuit comprising a pair of line terminals, a transmitter, a receiver, a line balancing network, and an induction coil having a first winding, a second winding and a third winding, said receiver connected across the terminals of said third winding, an auto transformer having a tap in the winding, a Zener diode in a series circuit with said auto transformer and connected from one line terminal through the second winding of said coil to the other line terminal, said transmitter connected in circuit across said diode and a portion of said auto transformer to said tap whereby excess current is shunted away from said transmitter by said diode, the line balancing network in a series circuit with said first winding of said coil and connected in circuit from one line terminal through the first winding of said induction coil to the other line terminal.

2. A telephone substation as claimed in claim 1 further including a capacitor in parallel with said diode, whereby said capacitor acts to carry the alternating current upon connection of the telephone to an extremely long line during which time the diode becomes non-conductive.

3. A telephone substation as claimed in claim 2 further including; a current sensitive resistance element, and a second tap on said auto transformer's winding, said current sensitive resistance element connected between said second tap on said auto transformer and the junction between the terminal of the second winding and the terminal of the auto transformer other than that connected to said capacitor and diode, whereby said current sensitive resistance element acts to limit the maximum transmitted signal level.

4. A telephone substation as claimed in claim 3 wherein a fixed value of resistance is included in series with said current sensitive resistance element to limit the minimum shunt impedance that can be presented to the signal.

5. A telephone substation as claimed in claim 1 wherein said induction coil first and second windings each include a tap intermediate their terminal and further including a second current sensitive resistance element connected in circuit between said tap of said first and said second winding to thereby control the level of the received signal by varying the shunt impedance.

6. A telephone substation as claimed in claim 5 wherein a fixed value of resistance is included in series with said second current sensitive resistance element to limit the minimum shunt impedance that can be presented to the incoming signal.

7. The combination in accordance with claim 5 wherein each of said current sensitive resistance elements comprise silicon junction oppositely poled parallel type devices.

References Cited

UNITED STATES PATENTS

| | | | |
|---|---|---|---|
| 2,629,783 | 2/1953 | Hopkins | 179—81 |
| 2,643,300 | 6/1953 | de Stadelhofen et al. | 179—81 |
| 2,801,289 | 7/1957 | Pye | 179—81 |

KATHLEEN H. CLAFFY, Primary Examiner

W. A. HELVESTINE, Assistant Examiner